(12) United States Patent
Van De Logt

(10) Patent No.: US 7,472,949 B2
(45) Date of Patent: Jan. 6, 2009

(54) OPEN ROOF CONSTRUCTION FOR A VEHICLE AND METHOD FOR OPENING IT

(75) Inventor: Frank Hendricus Gerardus Van De Logt, DC Bergen (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 11/516,286

(22) Filed: Sep. 6, 2006

(65) Prior Publication Data

US 2007/0085384 A1   Apr. 19, 2007

Related U.S. Application Data

(63) Continuation-in-part of application No. 10/591,380, filed as application No. PCT/EP2005/050886 on May 9, 2007, now abandoned.

(30) Foreign Application Priority Data

Mar. 1, 2004   (EP) ................... 04100798

(51) Int. Cl.
*B60J 7/00* (2006.01)

(52) U.S. Cl. .................. 296/214; 296/220.01
(58) Field of Classification Search .................. 296/214, 296/220.01
See application file for complete search history.

(56) References Cited

U.S. PATENT DOCUMENTS

| 1,826,871 A | 10/1931 | Ford ....................... 296/220.01 |
| 3,713,689 A | 1/1973 | Podolan et al. ......... 296/220.01 |
| 4,852,938 A | 8/1989 | Ball et al. |
| 5,362,122 A * | 11/1994 | Reihl et al. ............. 296/216.03 |
| 5,421,635 A | 6/1995 | Reinsch et al. ......... 296/220.01 |
| 5,823,605 A | 10/1998 | Seargeant ............... 296/100.09 |
| 5,941,598 A | 8/1999 | Caye |
| 5,951,100 A * | 9/1999 | Ewing et al. ................. 296/214 |
| 6,056,352 A | 5/2000 | Bendixen et al. |
| 6,129,413 A | 10/2000 | Klein ...................... 296/220.01 |
| 6,196,626 B1 | 3/2001 | Ito ............................... 296/214 |
| 6,457,770 B1 | 10/2002 | Pfalzgraf et al. |
| 6,474,731 B2 | 11/2002 | De Gaillard ............ 296/220.01 |
| 6,604,782 B2 | 8/2003 | De Gaillard et al. ... 296/216.04 |
| 6,623,064 B2 | 9/2003 | Schutt et al. ................ 296/108 |
| 6,669,201 B1 | 12/2003 | Guillez et al. .......... 296/220.01 |
| 6,890,022 B2 | 5/2005 | Doncov et al. .............. 296/213 |
| 2001/0028181 A1 | 10/2001 | Pfalzgraf et al. |
| 2001/0051245 A1 | 12/2001 | Seifert |
| 2002/0030388 A1 | 3/2002 | Pfalzgraf et al. |
| 2002/0074832 A1 | 6/2002 | Schutt et al. ............ 296/220.01 |
| 2005/0140164 A1 | 6/2005 | Wilms et al. |

FOREIGN PATENT DOCUMENTS

DE   3223136 A   3/1983

(Continued)

*Primary Examiner*—Dennis H Pedder
(74) *Attorney, Agent, or Firm*—Steven M. Koehler; Westman, Champlin & Kelly, P.A.

(57) ABSTRACT

An open roof construction or assembly for a vehicle includes a closure assembly for the roof opening comprising a number of separate closure panels. A sunshade assembly also comprises a number of separate sunshade panels. In an opened position of the open roof construction, the closure panels and sunshade panels, respectively, define separate stacks one behind the other, in any order, in the longitudinal direction of the vehicle.

9 Claims, 8 Drawing Sheets

FOREIGN PATENT DOCUMENTS

| | | |
|---|---|---|
| DE | 4127624 | 9/1992 |
| DE | 4203228 | 8/1993 |
| DE | 10043712 | 7/2002 |
| DE | 10063055 A | 7/2002 |
| EP | 0554694 | 8/1993 |
| FR | 2694245 | 2/1994 |
| GB | 2258848 | 2/1993 |
| WO | WO 03/076220 | 9/2003 |

* cited by examiner

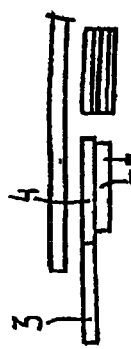
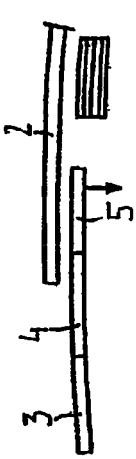
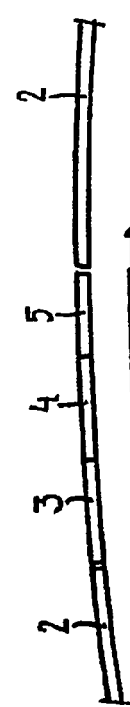

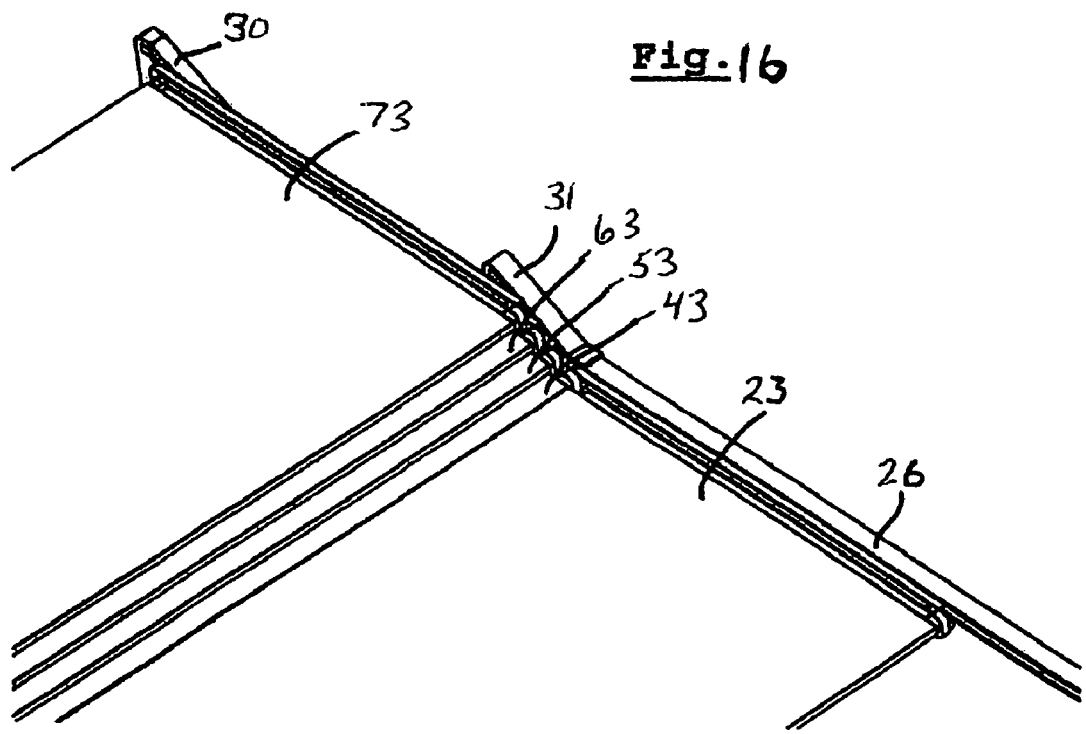

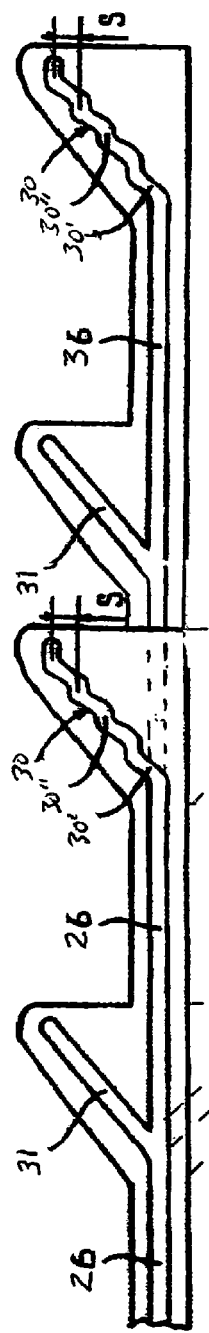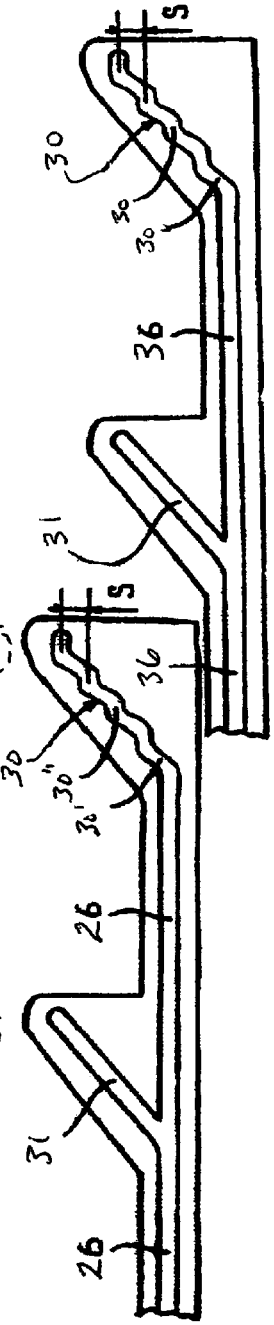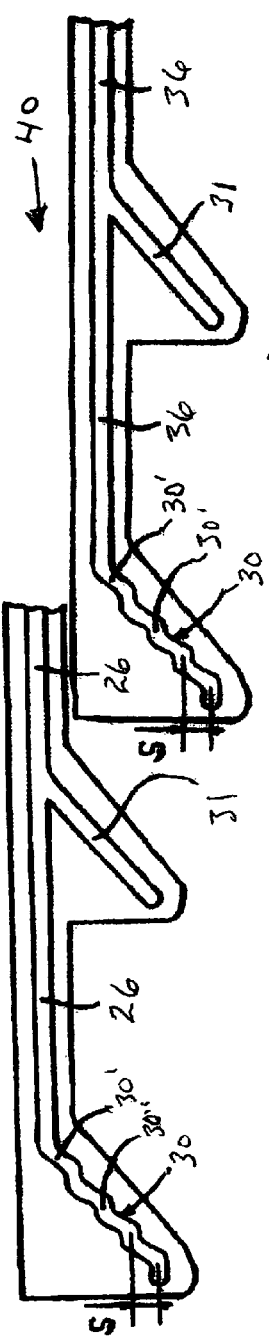

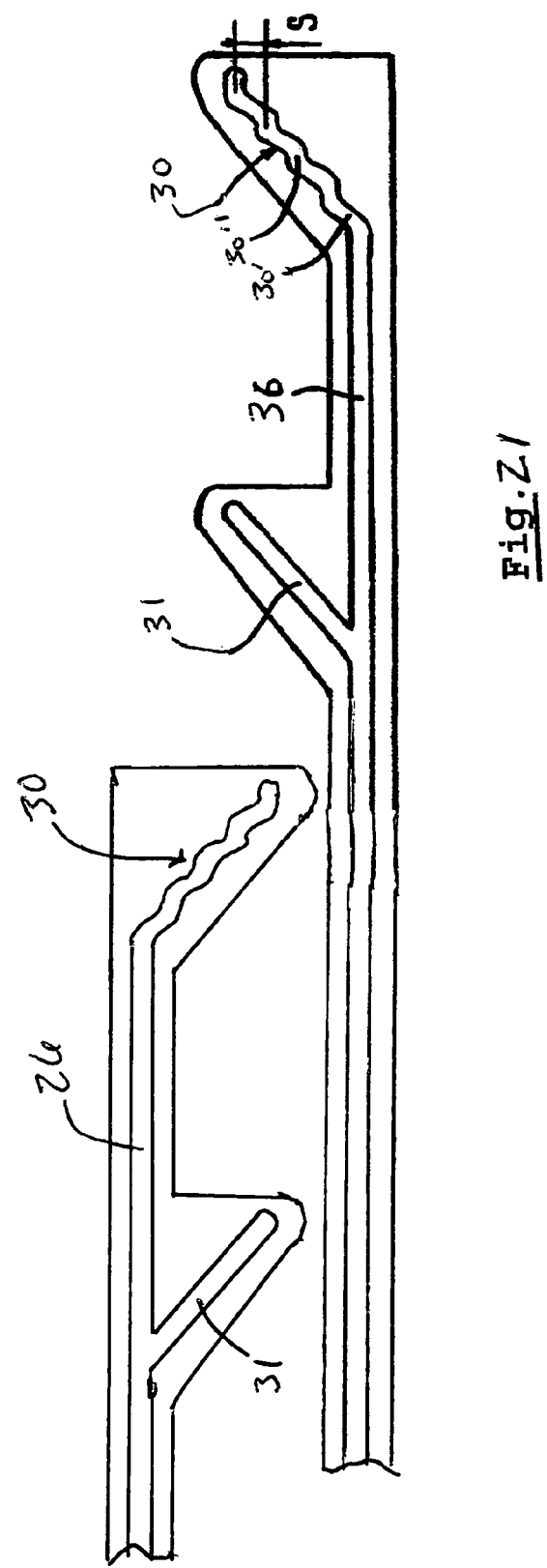

OPEN ROOF CONSTRUCTION FOR A VEHICLE AND METHOD FOR OPENING IT

CROSS-REFERENCE TO RELATED APPLICATION

This Application is a Continuation-In-Part application and claims priority of U.S. application Ser. No. 10/591,380, filed May 9, 2007, now abandoned, which is a Section 371 National Stage Application of International Application No. PCT/EP2005/050886, filed Mar. 1, 2005 and published as WO 2005/082659 A1 on Sep. 9, 2005, in English, the contents of both which are hereby incorporated by reference in their entirety.

BACKGROUND

The discussion below is merely provided for general background information and is not intended to be used as an aid in determining the scope of the claimed subject matter.

The invention firstly relates to an open roof construction for a vehicle, comprising a roof opening provided in a stationary roof part, a closure means which is movable between a position for closing said roof opening and a position for opening said roof opening, and a sunshade means which is movable between a position overlapping said roof opening and a position freeing said roof opening, wherein the closure means comprises a number of separate closure panels positioned, in the closing position of the closure means, one behind the other in the longitudinal direction of the vehicle, whereas the sunshade means comprises a number of sunshade panels positioned, in the overlapping position of the sunshade means, one behind the other in the longitudinal direction of the vehicle, and wherein the closure panels as well as the sunshade panels assume a stacked position one on top of the other behind the roof opening when positioned in the opening and freeing position, respectively.

Such an open roof construction is known from DE-A-19851366. In this known open roof construction the closure means comprises a forward and rearward closure panel, whereas the sunshade means comprises a forward and rearward sunshade panel. In the opening position of the closure means and freeing position of the sunshade means these four panels are moved below the stationary roof part in such a manner, that all four panels are positioned one on top of the other. When such a configuration is used in an open roof construction, in which the closure means and sunshade means comprise a larger number of separate panels, the overall height of the stack of panels in the opening and freeing position of the closure means and sunshade means, respectively, would increase considerably, which may cause problems because of a reduced height of the passenger compartment of the vehicle.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

An aspect of the present invention is to provide an open roof construction of the type referred to above, in which said disadvantage is prevented in a simple, yet nevertheless effective manner.

Thus, in accordance with this aspect of the present invention an open roof construction or assembly for a vehicle, having a roof opening provided in a stationary roof part, includes a closure means which is movable between a position for closing said roof opening and a position for opening said roof opening, and a sunshade means which is movable between a position overlapping said roof opening and a position freeing said roof opening, wherein the closure means comprises a number of separate closure panels positioned, in the closing position of the closure means, one behind the other in the longitudinal direction of the vehicle, whereas the sunshade means comprises a number of sunshade panels positioned, in the overlapping position of the sunshade means, one behind the other in the longitudinal direction of the vehicle, and wherein the closure panels as well as the sunshade panels assume a stacked position one on top of the other behind the roof opening when positioned in the opening and freeing position, respectively. In addition, the closure panels and sunshade panels, respectively, define separate stacks one behind the other in the longitudinal direction of the vehicle.

Because the closure panels at one hand and the sunshade panels at the other hand define separate stacks positioned one behind the other, the overall height of such stacks may be limited, such that no problems arise with respect to the inner height of the passenger compartment of the vehicle.

It is noted, that is not strictly necessary, that only one stack of closure panels and only one stack of sunshade panels are formed. It might be possible, that the closure panels are arranged in more than one stack. This also applies to the sunshade panels. However, in one embodiment, the closure panels will define only one stack, and the sunshade panels will define only one other stack.

In accordance with an embodiment of the open roof construction according to the present invention, the stack of stacked sunshade panels is positioned behind the stack of stacked closure panels. Such a positioning of a stack of closure panels will simplify an operating mechanism needed for moving the respective panels towards their respective positions. In most cases, stacking the closure panels only will be possible after removing the sunshade panels, i.e. after moving the sunshade panels towards their freeing position (in which they define the stack of sunshade panels). When, in such a case, the stack of closure panels would be positioned behind the stack of sunshade panels, the closure panels would have to bypass the stack of sunshade panels in some manner, which then would complicate the operating mechanism considerably.

The complexity of any operating mechanism may be limited, when in accordance with yet another embodiment of the open roof construction according to the present invention, in the stack of sunshade panels the rearmost sunshade panel is positioned at the top and the foremost sunshade panel is positioned at the bottom, with intermediate sunshade panels assuming corresponding positions in the stack.

The same applies, when, in accordance with still another embodiment of the open roof construction in accordance with the present invention, in the stack of closure panels the rearmost closure panel is positioned at the bottom and the foremost closure panel is positioned at the top, with intermediate closure panels assuming corresponding positions in the stack.

Another aspect of the invention secondly refers to a method for opening an open roof construction for a vehicle of the type comprising a roof opening provided in a stationary roof part, a closure means which is movable between a position for closing said roof opening and a position for opening said roof opening, and a sunshade means which is movable between a position overlapping said roof opening and a position freeing said roof opening, wherein the closure means comprises a number of separate closure panels positioned, in the closing position of the closure means, one behind the other in the longitudinal direction of the vehicle, whereas the sunshade means comprises a number of sunshade panels positioned, in the overlapping position of the sunshade means, one behind the other in the longitudinal direction of the vehicle, wherein the closure panels as well as the sunshade panels are moved towards a stacked position one on top of the other behind the roof opening when being moved towards the opening and freeing position, respectively.

In accordance with this aspect of the present invention, said method includes stacking the closure panels and sunshade panels, respectively, in separate stacks one behind the other in the longitudinal direction of the vehicle.

BRIEF DESCRIPTION OF THE DRAWINGS

Hereinafter the invention will be elucidated referring to the drawings, in which an embodiment of an open roof construction according to the present invention is illustrated.

FIGS. 1-7 show schematically an open roof construction in accordance with the present invention at successive stages during opening it;

FIG. 16 shows, perspectively, a number of panels stacked;

FIG. 17 shows parts of guides on a larger scale;

FIG. 19 shows parts of guides on a larger scale for another embodiment;

FIG. 20 shows parts of guides on a larger scale for yet another embodiment; and

FIG. 21 shows parts of guides on a larger scale for yet another embodiment.

DETAILED DESCRIPTION

Figure 8:
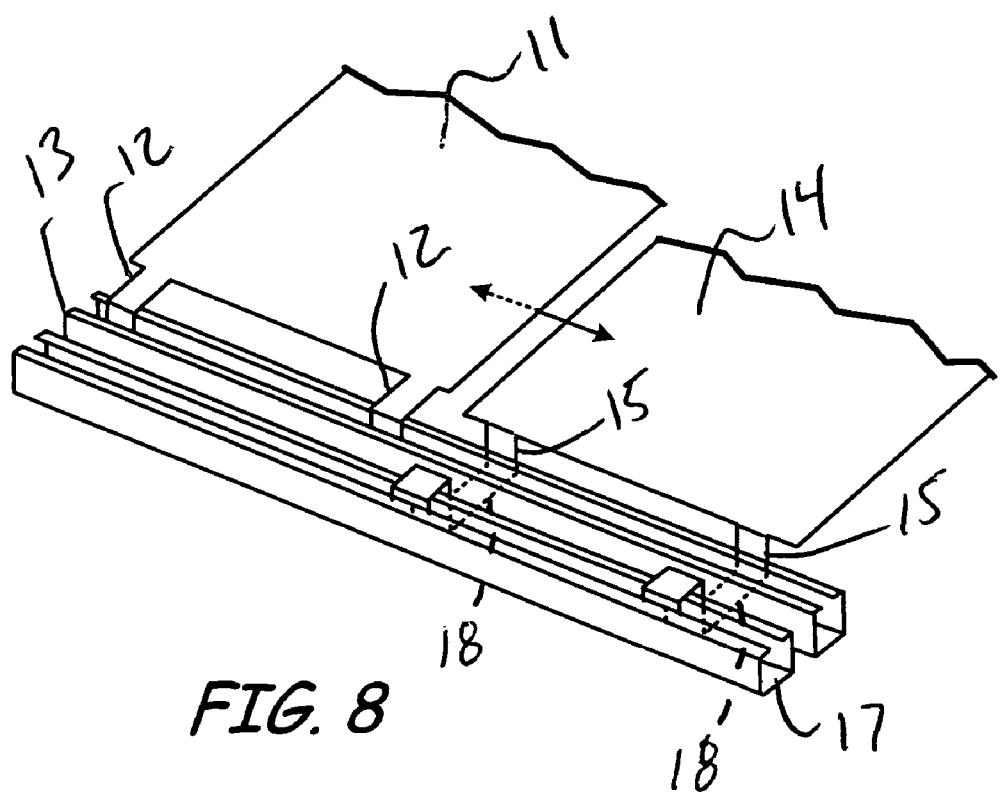
FIG. 8 shows, schematically, an exemplary arrangement of guides and panels.

The open roof construction for a vehicle in accordance with the present invention comprises a roof opening 1 (best seen in FIG. 5) provided in a stationary roof part 2. In FIG. 1 said roof opening 1 is closed by means of a closure means comprising three separate closure panels 3,4,5 positioned one behind the other in the longitudinal direction 6 of the vehicle. The use of the phrase 'separate' does not necessarily mean that the panels are not interconnected.

The closure means 3, 4, 5 is movable between the closing position illustrated in FIG. 1 (in which said roof opening 1 is fully closed) and an opening position (illustrated in FIG. 7) in which the roof opening is fully opened.

Positioned below the closure means is a sunshade means comprising four separate sunshade panels 7-10 positioned one behind the other in the longitudinal direction 6 of the vehicle. Also here, the use of the phrase 'separate' does not necessarily mean that the panels are not interconnected. The sunshade means 7-10 is movable between the position illustrated in FIG. 1 in which it overlaps the roof opening 1 and the position illustrated in FIG. 7, in which it frees the roof opening 1.

As clearly illustrated in FIG. 7, the closure panels 3-5 and sunshade panels 7-10 define separate stacks $S_1$ and $S_2$ one behind the other in the longitudinal direction 6 of the vehicle. Specifically, stack S, comprising the closure panels 3-5 is positioned ahead stack $S_2$ comprising the sunshade panels 7-10.

When opening the open roof construction illustrated in FIG. 1, firstly the sunshade means (sunshade panels 7-10) are moved rearwardly (FIG. 1). When the rearmost sunshade panel 10 has reached the location of the future stack $S_2$, it is moved upwardly, whereas the remaining sunshade panels 7-9 are moved further until the next sunshade panel 9 is positioned below sunshade panel 10 (FIG. 3).

This process is repeated until all four sunshade panels 7-10 are positioned in stack $S_2$ (FIG. 4), in which stack $S_2$ the rearmost sunshade panel 10 is positioned at the top and the foremost sunshade panel 7 is positioned at the bottom of the stack.

Next the closure means (closure panels 3-5) are lowered and moved rearwardly, until the rearmost closure panel 5 has reached the position of the future stack $S_1$ (FIG. 5). Then, the rearmost closure panel 5 is lowered and the remaining closure panels 4 and 3 are moved further until closure panel 4 is positioned above closure panel 5 (FIG. 6). Finally the assembly of closure panels 4 and 5 is lowered further and the remaining closure panel 3 is positioned on top of this assembly. This completes stack $S_1$ comprising closure panels 3-5 (FIG. 7).

For again closing the open roof construction the described succession of steps will be reversed.

FIG. 8 shows one exemplary arrangement of guides and panels that are parts of sets of panels that can be stacked in the manner described above. Generally, the set of panels for the closure means is guided in a guide rail separate from the set of panels for the sunshade, which is guided in a different guide rail. In the embodiment shown, panel 11 is a panel from the set of closure panels that includes guide shoes 12 that are guided by a guide or guide rail 13. Likewise, panel 14 is a panel from the set of sunshade panels that includes guide shoes 15 that are guided by a guide or guide rail 17. In view that the guide rails 13 and 17 are in a side-by-side arrangement, guide shoes 15 each include a "U-shaped" support 18 that extends from the end of the panel 14, herein under guide rail 13 (although over would also work) and then in between guide rails 13 and 17 so as to support guide elements (not shown) for panel 14 in the guide rail 17. With this construction, but not intended to be limiting, stacking of the panels may be easiest by stacking the sunshade panels farthest from the roof opening in the opened position, while the panels of the closure means are stacked closest to the roof opening as illustrated in FIG. 7.

As appreciated by those skilled in the art, the guide rails 13 and 17 can be open upwardly such as shown, downwardly or to the side in the side-by-side arrangement illustrated. Depending on the position of the guide rails 13 and 17 and the direction in which they open toward, support portions (similar to support 18) for one of the set of panels may take other configurations to go around the guide rail for the other set of panels. However, in yet a further embodiment, the guide rails can be oriented vertically with one guide rail above another guide rail in which case the guide shoes have supports that can extend directly into each corresponding guide rail without having to go around the other guide rail.

The following description provides an exemplary embodiment for stacking panels.

Figure 9:
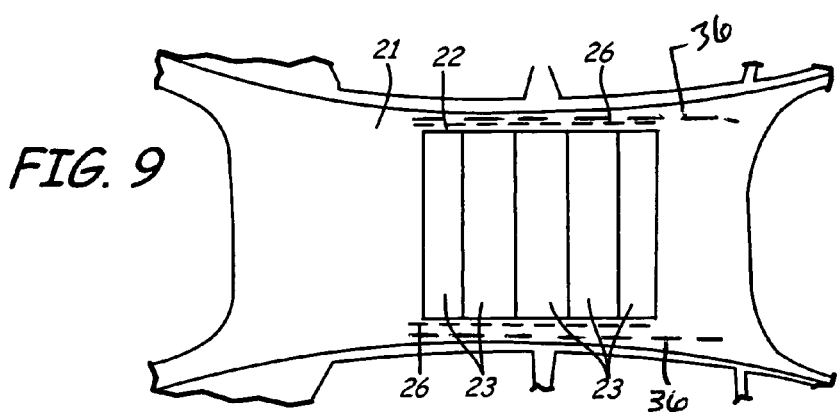
FIG. 9 shows, schematically, a partial top plan view of a vehicle comprising an open roof assembly.

FIG. 9 shows partially in a top plan view a stationary roof section 21 of a vehicle in which a roof opening 22 is defined and has an open roof construction or assembly having a plurality of closure panels 23 and sunshade panels (not shown).

Figure 10:
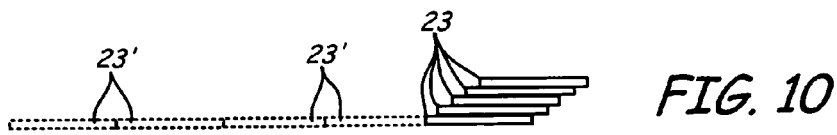
FIG. 10 shows, schematically and in a side elevational view, the process of stacking panels.

By means of a motion assembly to be described hereinafter, the panels 23 are movable between a coplanar position in which they are positioned adjacent each other and extends generally in the same plane, and a stacked position in which the panels 23 are positioned one on top of the other. FIG. 10 illustrates both positions. The stack of panels 23 illustrated in full lines indicates the stacked position of the panels, whereas the panels 23' illustrated in dotted lines, together with the lowermost panel 23 of the stack of panels, define the coplanar position. In the coplanar position the panels will close the roof opening 22, whereas in the stacked position the roof opening 22 will be open.

Figure 11:
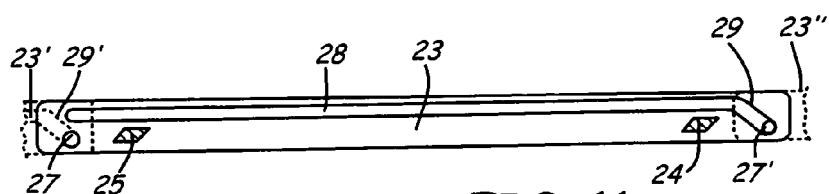
FIG. 11 shows on an enlarged scale, again schematically and in a side elevational view, a panel.

In FIG. 11 one longitudinal side of a panel 23 is shown schematically and in an elevational view. It is noted, that the opposite longitudinal side of the panel 23 will have the same design (although mirror-shaped). This longitudinal side is provided with a forward guide pin 24 and a rearward guide pin 25 extending transversally from the longitudinal side. These guide pins 24 and 25 each are guidinly housed in a guide 26 (FIG. 9) extending substantially in parallel to said longitudinal sides along the roof opening 22.

Further each longitudinal side of a panel 23 is provided with a connecting pin 27 which, in the illustrated embodiment, is located near to the rearward guide pin 25. Finally, each longitudinal side of the panel 23 is provided with a curve 28 extending substantially in parallel two said longitudinal side. Near to the forward guide pin 24 said curve 28 ends in an inclined curve section 29.

In the coplanar position of the panels 23, the connecting pin 27 engages the inclined curve section 29' of an adjacent panel 23' (as indicated in the left part of FIG. 11). In a corresponding manner the inclined curve section 29 of the panel 23 will be engaged by a connecting pin 27' of a next panel 23" (see right part of FIG. 11).

In the coplanar position of the panels 23, the forward guide pin 24 and rearward guide pin 25 of all successive panels 23 are positioned in the guide 26 for a linear movement, when at least one of said panels 23 is driven by a driving device not shown in detail (but known per se and can include for example, hand cranks, motors, etc.), such as for example a cable drive. The driving connection between adjacent panels 23 is established by the cooperation between the connecting pins 27 and inclined curve sections 29.

Figure 12:
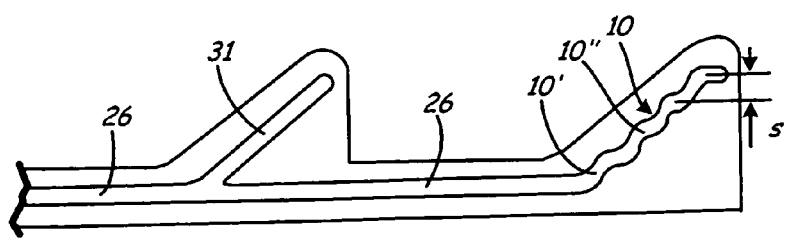
FIG. 12 shows part of a guide on a larger scale.

Now reference is made to FIG. 12, which illustrates part of the guide 26, especially said part which is operative when stacking panels into a stacked position. The guide 26 ends in a first inclined guide section 30 (which will be discussed in detail later). Further the guide 26 comprises a second inclined guide section 31 which, in the illustrated embodiment, branches off from the remainder of the guide 26. The first inlined guide section 30 is meant for receiving the forward guide pins 24 of successive panels 23, whereas the second inclined guide section 31 is meant for receiving the rearward guide pins 25 of successive panels 23.

Initially, a panel 23 will be positioned with its forward guide pin 24 and rearward guide pin 25 in the section of the guide 26 left (as seen in FIG. 12) from the second inclined guide section 31. When moving to the right (for opening the roof opening 22 while stacking the panels 23 into the stacked position) the forward guide pin 24 will pass the second inclined guide section 31 without entering it, and will finally reach the first inclined guide section 30. The rearward guide pin 25, however, will be forced into the second inclined guide section 31, whereas the forward guide pin 24 enters the first inclined guide section 30. As a result, the panel 23 will be moved upwards into both inclined guide sections 30 and 31, respectively, with its forward and rearward guide pins 24 and 25, respectively, under influence of a driving force transmitted by the inclined curve section 29 of a successive panel 23 to its connecting pin 27. At the same time, said connecting pin 27 will move upwards into said inclined curve section 29 towards the straight part of the curve 28.

A distance between the guide sections 30 and 31 can differ slightly from the distance between the guide pins 24 and 25, such that firstly only one of said guide pins will enter its respective guide section, shortly thereafter followed by the other guide pin entering its respective guide section. This will limit the loads on the structure.

As illustrated clearly in FIG. 12, the first inclined guide section 30 comprises alternating inclined parts 30' and parts 30" extending in parallel to the guide. The spacings between two successive parallel parts 30" substantially corresponds with the spacing of the panels 23 in the stacking direction (i.e. the distance a panel 32 will be lifted for enabling a successive panel 23 to pass therebeneath). Positioned in the parallel parts 30", the forward guide pins 24 provide the panels 23 with a stable position.

Figure 13:
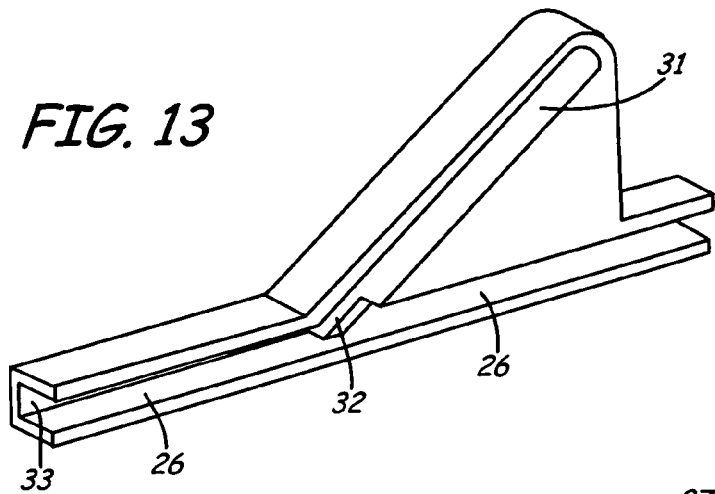
FIG. 13 shows, perspectively, part of a guide.

FIG. 13 shows a detail of the second inclined guide section 31. An inclined diversion element or wall section 32 protrudes from the back wall 33 of the guide 26 into said guide 26 and leads towards the second inclined guide section 31.

Figure 14:
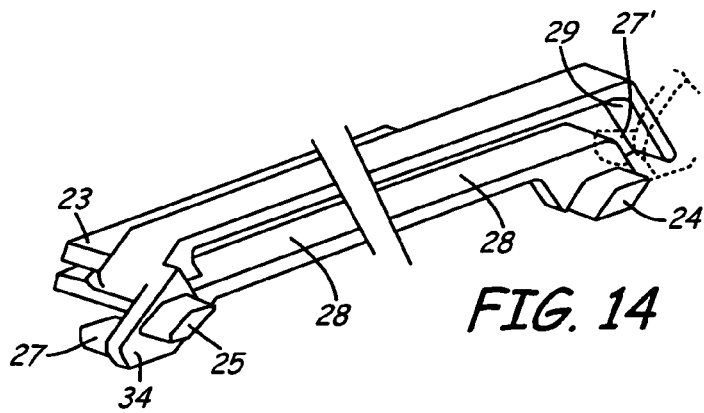
FIG. 14 shows, perspectively, part of a panel.

FIG. 14 shows a specific embodiment of a longitudinal side of a panel. Visible are the forward guide pin 24, rearward guide pin 25, connecting pin 27 and curve 28. In dotted lines a connecting pin 27' of an adjacent panel is illustrated, which connecting pin 27' engages the inclined curve section 29.

The rearward guide pin 25 is positioned on a base member 34, such that it projects further from said longitudinal side of the panel 23 then does the forward guide pin 24. As a result, the forward guide pin 24 can pass the inclined wall section 32 illustrated in FIG. 13 without entering the second inclined guide section 31, whereas the rearward guide pin 25 will be forced into said second inclined guide section 31 by the inclined wall section 32. Like this all forward guide pins 24 of successive panels 23 will be moved towards the first inclined guide section 30, whereas all rearward guide pins 25 will be moved into the second inclined guide section 31.

Figure 15:
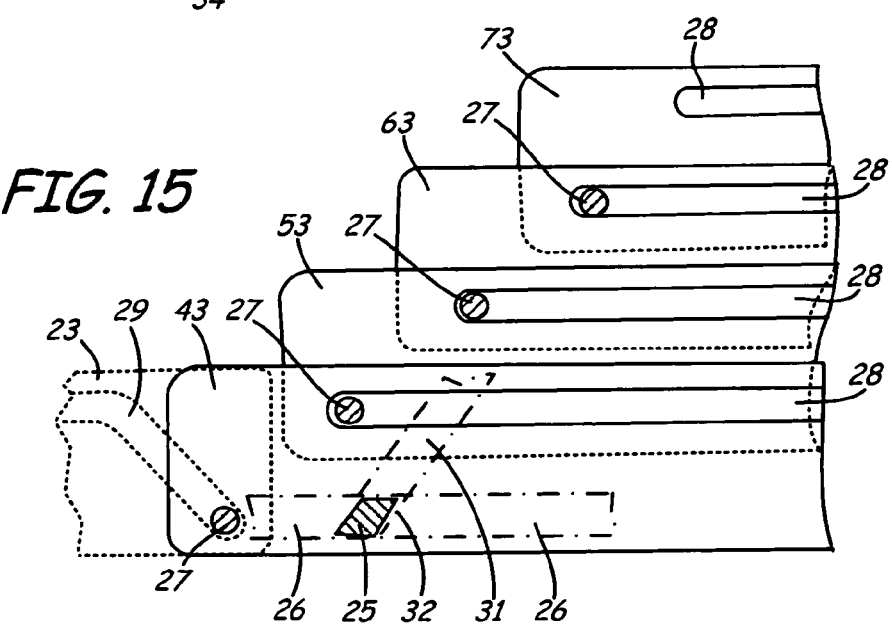
FIG. 15 shows, still further enlarged and partially, a number of stacked panels.

In FIG. 15 four stacked panels 43, 53, 63 and 73 are illustrated partially. The connecting pins 27 of the panels 53, 63 and 73 engage the horizontal part of the curves 28 of the panels 43, 53, 63, respectively. The connecting pin 27 of the lowermost panel 43 engages the inclined curve section 29 of an adjacent, following panel 23 (indicated in dotted lines). The lowermost panel 23 is at the beginning of its lifting process, because its rearward guide pin 25 has reached the inclined wall section or diversion element 32 of the second inclined guide section 31 of the guide 26. FIG. 16 shows, perspectively, a situation, which corresponds with the situation illustrated in FIG. 15.

Figure 18:
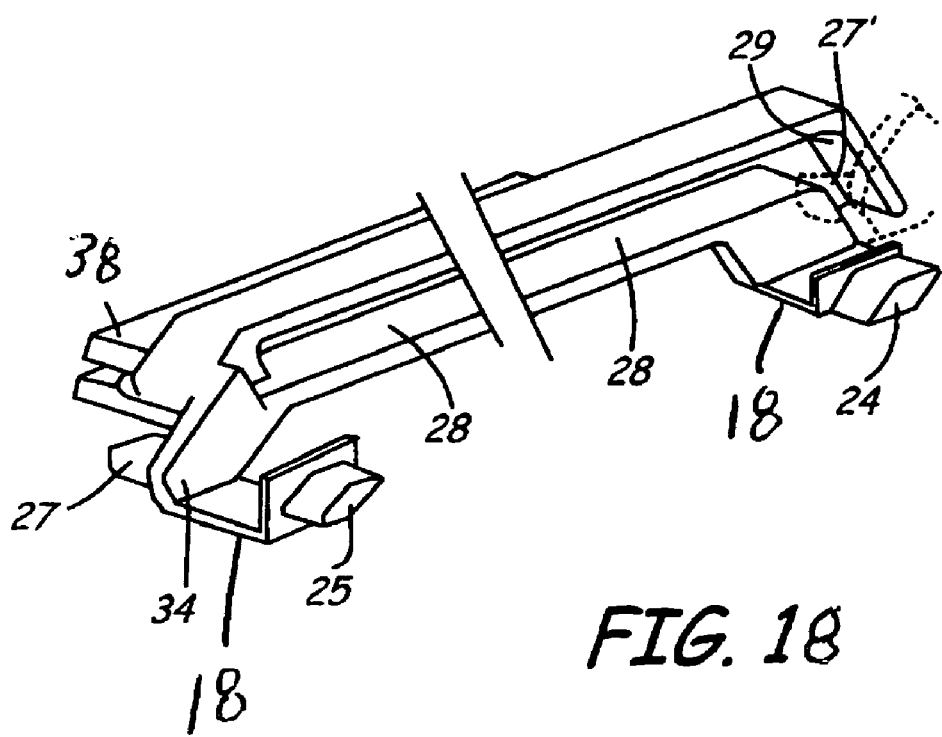
FIG. 18 shows, perspectively, part of a panel.

In the exemplary embodiment, the sunshade panels use similar components and stack in a similar way. Referring to FIG. 9, the open roof construction or assembly also has a guide 36 herein positioned adjacent to guide 26 in a manner similar to that illustrated in FIG. 8. FIG. 18 is a side elevation view that illustrates both portions of guides 6 and 36. References numbers 30, 30', 30" and 31 have been repeated in guide 36 since the elements they refer to function in the same manner as guide 6.

FIG. 18 shows a specific embodiment of a longitudinal side of a sunshade panel 38. Visible are the forward guide pin 24, rearward guide pin 25, connecting pin 27 and curve 28 like in panel 33. Similarly, like panels 33, in dotted lines a connecting pin 27' of an adjacent sunshade panel is illustrated, which connecting pin 27' engages the inclined curve section 29. Guide pins 24 and 25 function in a manner similar to that found with guide 6; however, "U-shaped" support portions 18 such as shown in FIG. 8 allows the guide shoes to go around guide 6. It should be noted since the inclined guide sections 30 and 31 of guide 36 are spaced apart from the end of guide 6 in FIG. 17, when the panels for the sunshade are pushed past guide 6, the "U-shaped" supports 18 are no longer blocked by guide 6 and can follow the inclined guide sections 30 and 31 of guide 36.

FIG. 19 illustrates another embodiment that stacks the closure panels and sunshade panels by lifting each panel and moving a following panel underneath. However, in this embodiment, the guides 6 and 36 are arranged vertically. Thus in this embodiment, both assemblies can use panels having ends with the construction of FIG. 14 since interference is not present.

Although in the illustrated previous embodiments successive panels are stacked by lifting each panel and moving a following panel underneath, it also would be possible to stack the panels by lowering a panel and moving a successive panel thereover. FIG. 20 illustrates one exemplary arrangement for the guides 6 and 36 to lower panels. The guide pins and channels formed on the end of the panels would be suitably adapted to interface with this arrangement of the guides 6 and 36, although as appreciated by those skilled in the art other configurations can be used to accomplish stacking panels by lowering each panel and moving a successive panel thereover to open the roof opening. It should be noted in this embodiment the panels move in the direction indicated by arrow 40 to their open positions, where the closure panels guided by guide 26 would be stacked farthest from the roof opening. Another mechanism for stacking and connecting panels in this manner is described in published U.S. patent application US2005/0140164, which is hereby incorporated by reference in its entirety.

Finally, FIG. 21 illustrates guides 26 and 36 for closure panels and sunshade panels, respectively, where the closure panels are lowered and the sunshade panels are lifted in a manner illustrated in FIGS. 1-7.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims. For example, when the closure means and/or sunshade means comprises a large number of separate panels, more than one stack of each type of panels may be formed when moving the open roof construction towards its open position.

What is claimed is:

1. An assembly for a vehicle having a roof opening provided in a stationary roof comprising a closure assembly which is movable between a closing position for closing said roof opening and an open position for opening said roof opening, and a sunshade assembly which is movable between a closed position overlapping said closure assembly in the closing position and an open position freeing said roof opening, wherein the closure assembly comprises a first guide configured to guide a number of separate closure panels positioned, in the closing position of the closure assembly, one behind the other in the longitudinal direction of the vehicle, whereas the sunshade assembly comprises a second guide configured to guide a number of sunshade panels positioned, in the overlapping position of the sunshade assembly, one behind the other in the longitudinal direction of the vehicle, and wherein the first guide and the second guide are each configured to guide the closure panels and the sunshade panels, respectively, so as to assume a stack where the respective panels are stacked one on top of the other behind the roof opening when the panels are positioned in the corresponding opening position, and wherein the closure panels and sunshade panels, respectively, define separate stacks one behind the other, in any order, in the longitudinal direction of the vehicle.

2. The assembly according to claim 1, wherein the second guide is configured so as to position the stack of stacked sunshade panels behind the stack of stacked closure panels.

3. The assembly according to claim 2, wherein the second guide is configured so as to position a rearmost sunshade panel, in the longitudinal direction when the sunshade panels are in the closed position, at a top of the stack and a foremost sunshade panel, in the longitudinal direction when the sunshade panels are in the closed position, at a bottom of the stack, with intermediate sunshade panels assuming corresponding positions in the stack.

4. The assembly according to claim 3, wherein the first guide is configured so as to position a rearmost closure panel, in the longitudinal direction when the closure panels are in the closed position, at a bottom of the stack and a foremost closure panel, in the longitudinal direction when the closure panels are in the closed position, at a top of the stack, with intermediate closure panels assuming corresponding positions in the stack.

5. The assembly according to claim 2, wherein the first guide is configured so as to position a rearmost closure panel, in the longitudinal direction when the closure panels are in the closed position, at a bottom of the stack and a foremost closure panel, in the longitudinal direction when the closure panels are in the closed position, at a top of the stack, with intermediate closure panels assuming corresponding positions in the stack.

6. The assembly of claim 1, wherein transverse edges of adjacent closure panels are proximate each other in the closing position of the closure assembly, and wherein the first guide is configured to form the stack of the closure panels such that, for each closure panel, similar vertical movement of each of it's respective transverse edges is obtained, and wherein each closure panel moves a different vertical distance.

7. The assembly of claim 6, wherein transverse edges of adjacent sunshade panels are proximate each other in the overlapping position of the sunshade assembly, and wherein the second guide is configured to form the stack of the sunshade panels such that, for each sunshade panel, similar vertical movement of each of it's respective transverse edges is obtained, and wherein each sunshade panel moves a different vertical distance.

8. The assembly of claim 1, wherein transverse edges of adjacent sunshade panels are proximate each other in the overlapping position of the sunshade assembly, and wherein the second guide is configured to form the stack of the sunshade panels such that, for each sunshade panel, similar vertical movement of each of it's respective transverse edges is obtained, and wherein each sunshade panel moves a different vertical distance.

9. An assembly for a vehicle having a roof opening provided in a stationary roof comprising a closure assembly which is movable between a closing position for closing said roof opening and an open position for opening said roof opening, and a sunshade assembly which is movable between a closed position overlapping said closure assembly in the closing position and an open position freeing said roof opening, wherein the closure assembly comprises a number of separate closure panels positioned, in the closing position of the closure assembly, one behind the other in the longitudinal direction of the vehicle, whereas the sunshade assembly comprises a number of sunshade panels positioned, in the overlapping position of the sunshade assembly, one behind the other in the longitudinal direction of the vehicle, and wherein the closure panels as well as the sunshade panels each assume a stack where the respective panels are stacked one on top of the other behind the roof opening when the panels are positioned in the corresponding opening position, and wherein the closure panels and sunshade panels, respectively, define separate stacks one behind the other, in any order, in the longitudinal direction of the vehicle, the assembly further comprising a first guide to guide the panels of the closure assembly from the closing position to the stack of closure panels, wherein transverse edges of adjacent closure panels are proximate each other in the closing position of the closure assembly, and wherein the first guide is configured to form the stack of the closure panels such that, for each closure panel, similar vertical movement of each of it's respective transverse edges is obtained, and wherein each closure panel moves a different vertical distance, and a second guide to guide the panels of the sunshade assembly from the overlapping position to the stack of sunshade panels, wherein transverse edges of adjacent sunshade panels are proximate each other in the overlapping position of the sunshade assembly, and wherein the second guide is configured to form the stack of the sunshade panels such that, for each sunshade panel, similar vertical movement of each of it's respective transverse edges is obtained, and wherein each sunshade panel moves a different vertical distance.

* * * * *